United States Patent
Wolf

(10) Patent No.: US 7,448,695 B1
(45) Date of Patent: Nov. 11, 2008

(54) VEHICLE WHEEL COVER RETENTION SYSTEM AND METHOD FOR PRODUCING SAME

(75) Inventor: Joseph Wolf, Canton, MI (US)

(73) Assignee: Hayes Lemmerz International, Inc., Northville, MI (US)

( * ) Notice: Subject to any disclaimer, the term of this patent is extended or adjusted under 35 U.S.C. 154(b) by 0 days.

(21) Appl. No.: 11/584,432

(22) Filed: Oct. 20, 2006

Related U.S. Application Data

(60) Provisional application No. 60/728,515, filed on Oct. 20, 2005.

(51) Int. Cl.
*B60B 7/00* (2006.01)
(52) U.S. Cl. ............... 301/37.31; 301/37.35; 301/37.43
(58) Field of Classification Search ............ 301/37.102, 301/37.11, 37.31, 37.35, 37.36, 37.43, 37.101, 301/37.32
See application file for complete search history.

(56) References Cited

U.S. PATENT DOCUMENTS

| | | | | |
|---|---|---|---|---|
| 3,883,181 A | * | 5/1975 | Dissinger ................. | 301/37.42 |
| 3,918,762 A | * | 11/1975 | Hampshire ............... | 301/37.43 |
| 4,316,637 A | * | 2/1982 | Reynolds et al. ....... | 301/37.101 |
| 4,991,909 A | * | 2/1991 | Hamada .................. | 301/37.36 |
| 5,368,370 A | | 11/1994 | Beam | |
| 5,435,631 A | | 7/1995 | Maloney et al. | |
| 5,490,342 A | * | 2/1996 | Rutterman et al. ............ | 40/587 |
| 5,597,213 A | | 1/1997 | Chase | |
| 5,636,906 A | | 6/1997 | Chase | |
| 5,829,843 A | | 11/1998 | Eikhoff | |
| 5,921,634 A | * | 7/1999 | Eikhoff .................... | 301/37.43 |
| 6,152,538 A | * | 11/2000 | Ferriss et al. ............ | 301/37.33 |
| 6,637,832 B2 | * | 10/2003 | Wrase et al. ............. | 301/37.31 |
| 6,663,189 B2 | * | 12/2003 | Enomoto et al. ......... | 301/37.36 |
| 6,779,852 B2 | | 8/2004 | Van Houten et al. | |
| 2003/0015912 A1 | * | 1/2003 | Chase ..................... | 301/37.43 |
| 2007/0120415 A1 | * | 5/2007 | Kang ...................... | 301/37.24 |

FOREIGN PATENT DOCUMENTS

DE 3704384 * 8/1988

* cited by examiner

*Primary Examiner*—Russell D Stormer
(74) *Attorney, Agent, or Firm*—MacMillan, Sobanski & Todd, LLC

(57) ABSTRACT

A vehicle wheel cover retention system for securing a wheel cover to a vehicle wheel. In one embodiment, the vehicle wheel cover retention system comprises a wheel formed from a suitable material and including an outboard face having a retention groove formed therein near an outboard flange thereof; and a wheel cover formed from a suitable material and including an outer portion having a tab formed thereon and an outer annular extension extending radially outwardly relative to the tab toward the outboard flange of the wheel; wherein the tab is received in the retention groove to secure the wheel cover to the wheel.

20 Claims, 4 Drawing Sheets

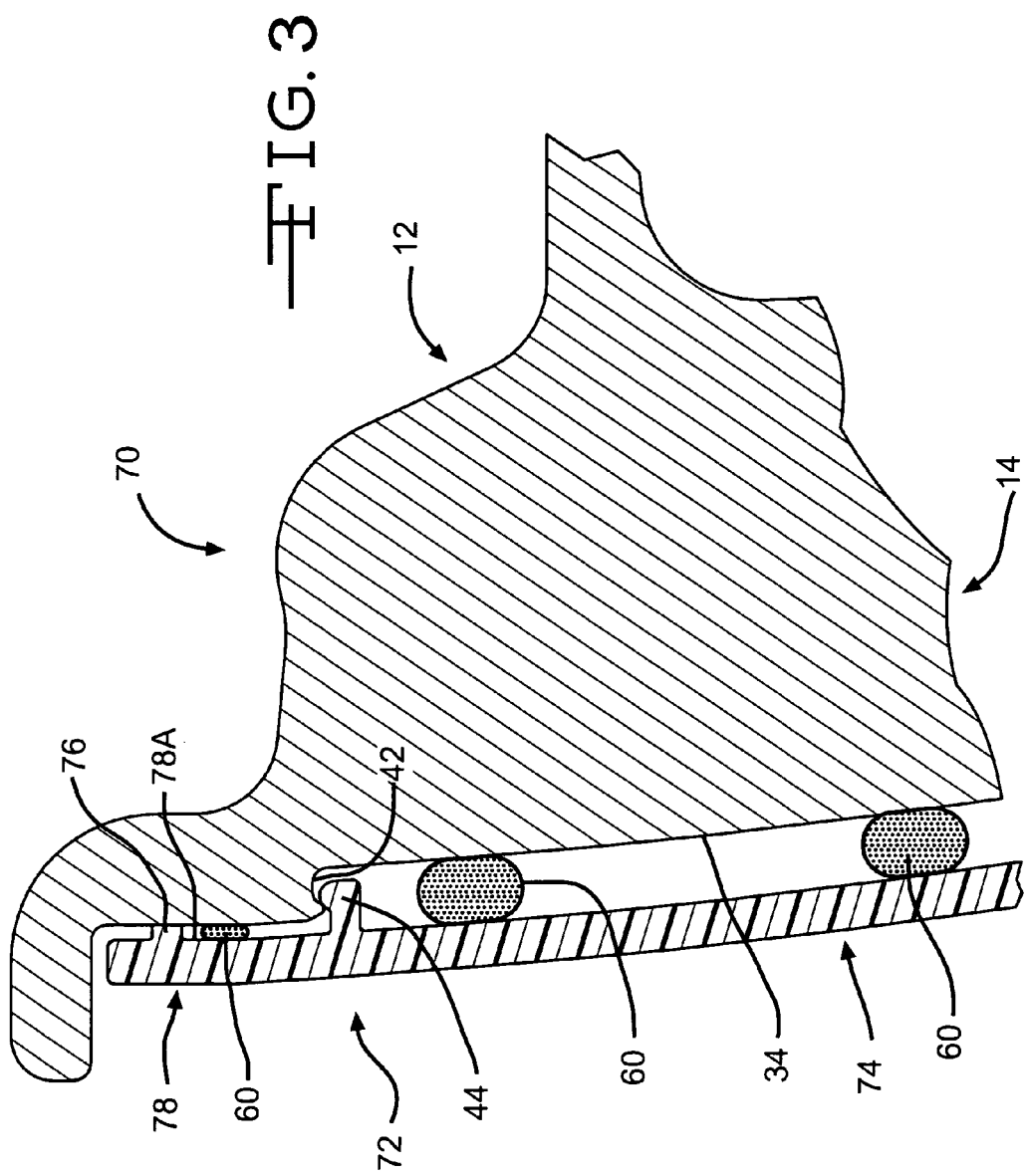

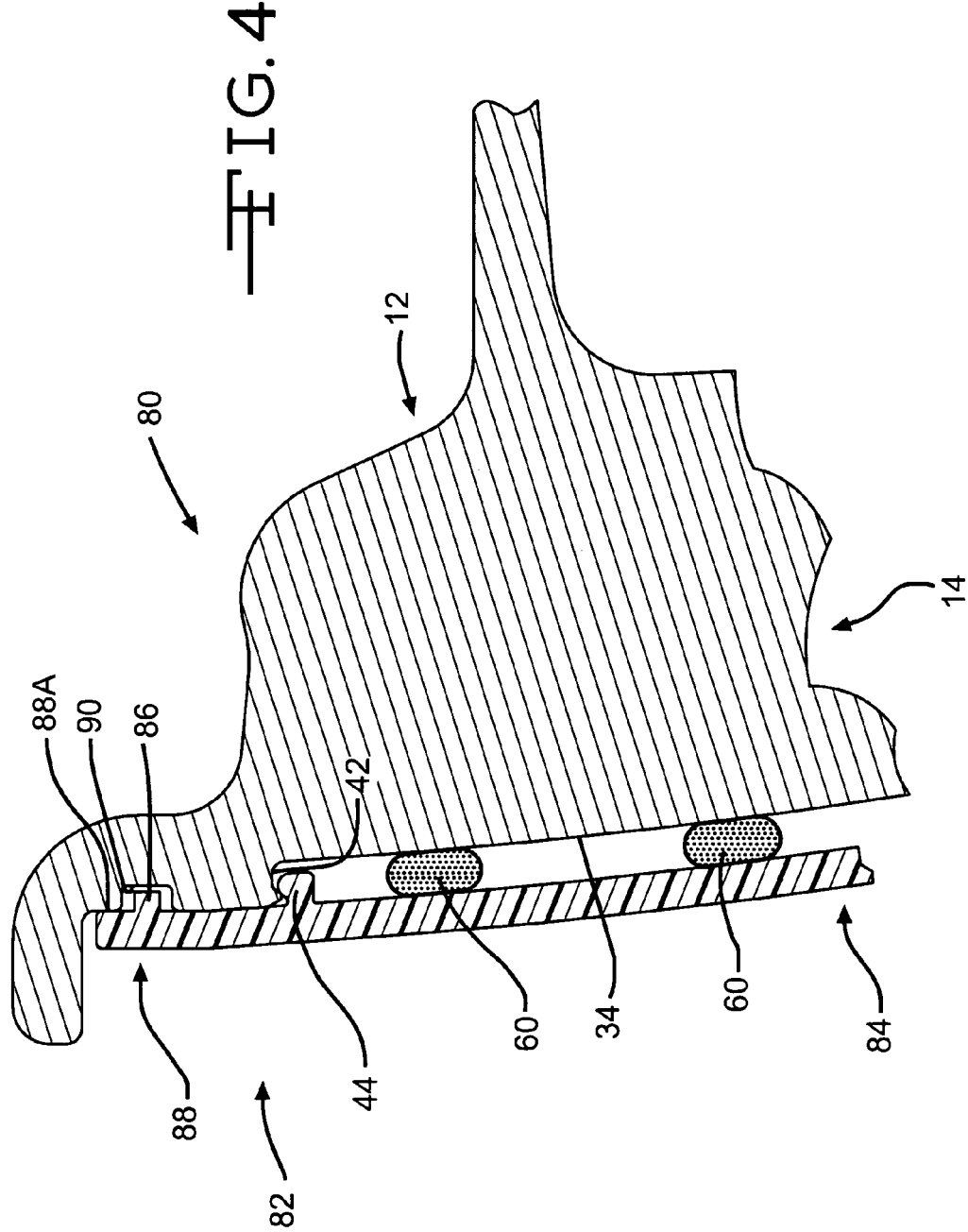

VEHICLE WHEEL COVER RETENTION SYSTEM AND METHOD FOR PRODUCING SAME

CROSS-REFERENCE TO RELATED APPLICATIONS

This application claims the benefit of U.S. Provisional Application Ser. No. 60/728,515, filed Oct. 20, 2005.

BACKGROUND OF THE INVENTION

This invention relates in general to vehicle wheels and, in particular, to an improved vehicle wheel cover retention system and method for producing the same.

Full or partial vehicle wheel covers of the removable type are well known and have been used for many years to enhance the styling of conventional, stamped wheel discs. Also, it is known to permanently secure a full or partial wheel cover to a vehicle wheel using an adhesive.

SUMMARY OF THE INVENTION

This invention relates to a vehicle wheel cover retention system for securing a wheel cover to a vehicle wheel. In one embodiment, the vehicle wheel cover retention system comprises a wheel formed from a suitable material and including an outboard face having a retention groove formed therein near an outboard flange thereof; and a wheel cover formed from a suitable material and including an outer portion having a tab formed thereon and an outer annular extension extending radially outwardly relative to the tab toward the outboard flange of the wheel; wherein the tab is received in the retention groove to secure the wheel cover to the wheel.

Other advantages of this invention will become apparent to those skilled in the art from the following detailed description of the preferred embodiments, when read in light of the accompanying drawings.

BRIEF DESCRIPTION OF THE DRAWINGS

FIG. 3 is a sectional view of a portion of the first embodiment of the vehicle wheel illustrated in FIG. 1.

FIG. 4 is a view of a portion of a second embodiment of a vehicle wheel including a wheel cover retention system.

DETAILED DESCRIPTION OF THE PREFERRED EMBODIMENTS

Figure 1:
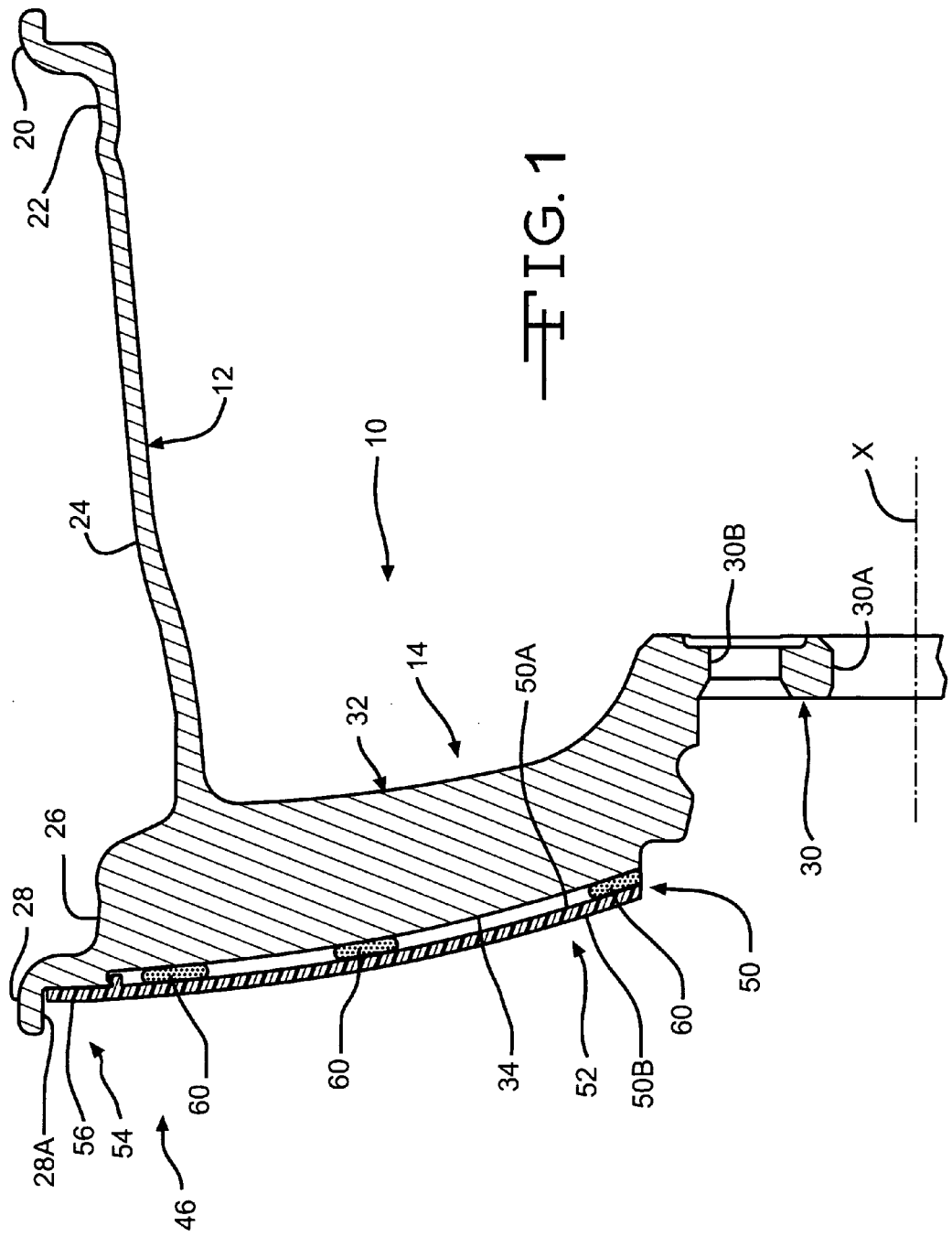
FIG. 1 is a view of a first embodiment of a vehicle wheel including a wheel cover retention system.

Referring now to the drawings, there is illustrated in FIG. 1 a portion of a vehicle wheel, indicated generally at 10, including a first embodiment of a wheel cover retention system, indicated generally at 46. The vehicle wheel 10 can be of any suitable type of material or materials, such as for example, steel, aluminum and alloys thereof, and can be of any suitable type of wheel construction, such as for example, a "full face" type of wheel, such as shown in FIG. 5A of U.S. Pat. No. 5,533,261 to Kemmerer, a "bead seat attached" wheel such as shown in FIG. 4 of U.S. Pat. No. 5,188,429 to Heck et al., a "well attached" wheel such as shown in FIG. 3 of U.S. Pat. No. 5,188,429 to Heck et al., a "bimetal" wheel construction including an aluminum disc and a steel rim such as shown in U.S. Pat. No. 5,421,642 to Archibald, a "modular wheel" construction such as shown in U.S. Pat. No. 5,360,261 to Archibald et al., a cast aluminum wheel such as shown in U.S. Pat. No. 5,340,418 to Wei, or a euro-flange type of wheel such as shown in U.S. Pat. No. 5,564,792 to Archibald, the disclosures of all of these patents incorporated by reference in entirety herein.

As shown in FIG. 1, in the illustrated embodiment the vehicle wheel 10 is a one piece full cast aluminum wheel and includes a wheel rim, indicated generally at 12, and a wheel disc, indicated generally at 14. The vehicle wheel 10 defines a horizontal or longitudinal vehicle wheel axis X. Alternatively, the construction, material and/or make-up of the vehicle wheel 10 may be other than illustrated if so desired.

In the illustrated embodiment, the wheel rim 12 includes an inboard tire bead seat retaining flange 20, an inboard tire bead seat 22, a generally axially extending well 24, an outboard tire bead seat 26, and an outboard tire bead seat retaining flange 28. Alternatively, the construction, material and/or make-up of the wheel rim 12 may be other than illustrated if so desired.

In the illustrated embodiment, the wheel disc 14 includes a generally centrally located wheel mounting surface or portion 30, an outer annular portion 32, and defines an outer surface or outboard face 34. The wheel mounting surface 30 of the wheel disc 14 is provided with a centrally located pilot aperture 30A and a plurality of lug bolt receiving holes 30B circumferentially spaced around the pilot aperture 30A (only one of such lug bolt receiving holes 30B illustrated in FIG. 1). The lug bolt receiving holes 30B receive lug bolts (not shown) and nuts (not shown) for securing the vehicle wheel 10 on an axle (not shown) of a vehicle. Also, the wheel disc 14 also includes one or more vent windows formed therein (not shown). Alternatively, the construction, material and/or make-up of the wheel disc 14 may be other than illustrated if so desired.

Figure 2:
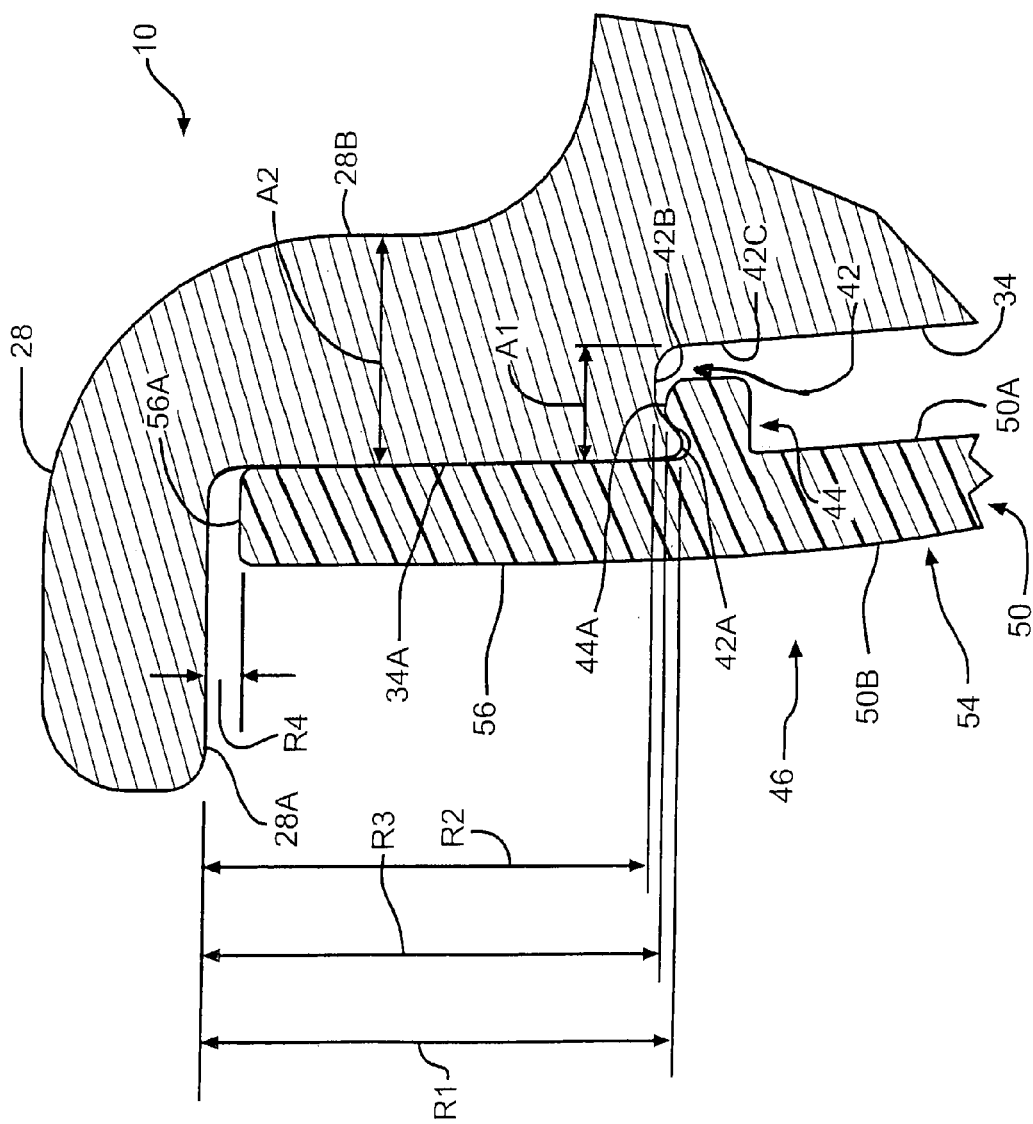
FIG. 2 is a view of a portion of the first embodiment of the vehicle wheel illustrated in FIG. 1.

As best shown in FIG. 2, the wheel cover retention system 40 includes a first retention element or feature, indicated generally at 42, and a second retention element or feature, indicated generally at 44. As will be discussed below, the first retention element 42 is formed in the outboard face 34 of the wheel disc 14, and the second retention element 44 is provided on a wheel cover, indicated generally at 50.

In the illustrated embodiment, the first retention element 42 is preferably formed in the outboard face 34 of the outer annular portion 32 of the wheel disc 14 near or proximate to the outboard tire bead seat retaining flange 28 of the wheel rim 12. In the illustrated embodiment, the first retention element 42 is formed as a generally radially outwardly circumferentially extending continuous groove which is formed in the outboard face 34 of the outer annular portion 32 of the wheel disc 14.

As best shown in FIG. 2, the first retention element 42 includes a circumferentially extending first or outer surface 42A and a circumferentially extending second or inner surface 42B. In the illustrated embodiment, the first surface 42A is preferably spaced a first radial distance R1 from a generally axially extending outer surface 28A of the outboard tire bead seat retaining flange 28 of the wheel rim 12. The second surface 42B is spaced a second radial distance R2 from the outer surface 28A of the outboard tire bead seat retaining flange 28 of the wheel rim 12.

In the illustrated embodiment, the first radial dimension R1 is greater than the second radial dimension R2 to thereby produce the first retention element 42 in the outboard face 34 of the wheel disc 14. Preferably, the first radial dimension R1 is in the range from about 1 mm to about 5 mm greater than the second radial dimension R2. More preferably, the first radial dimension R1 is about 2 mm greater than the second radial dimension R2. Also, in the illustrated embodiment, the second radial dimension R2 is preferably is of a sufficient dimension in order to provide a generally radially extending outermost surface 34A on the outboard face 34 of the wheel disc 14 adjacent the outer surface 28A of the outboard tire bead seat retaining flange 28. Alternatively, one or both of the first and second radial distances R1 and R2 may be other than illustrated and described if so desired.

In the illustrated embodiment, the first retention element 42 extends a generally first axial distance A1 from the outermost surface 34A of the wheel disc 14 to a generally radially extending inner surface 42C of the first retention element 42. A second axial distance A2 is defined between the outermost surface 34A of the wheel disc 14 and a generally radially extending inner surface 28B of the outboard tire bead seat retaining flange 28. Preferably, the first axial distance A1 is in the range from about one-third to about three-quarters the second axial distance A2. Alternatively, the first axial distance A1 and/or the second axial distance A2 may be other than illustrated and described if so desired.

In the illustrated embodiment, with the vehicle wheel 10 being a cast aluminum wheel, the first retention element 42 is preferably machined in the outboard face 34 of the outer annular portion 32 of the wheel disc 14 to predetermined tolerances following the casting of the vehicle wheel 10 in order to provide the retention purpose or function to be discussed below. Alternatively, the shape, construction and/or make-up of the first retention element 42 may be other than illustrated if so desired. For example, the first retention element 42 may be a plurality of non-continuous grooves and/or may have a different configuration than that which is illustrated if so desired.

Also, the first retention element 42 may be formed during or subsequent to the manufacture of the wheel disc and/or the vehicle wheel itself by suitable methods if so desired. For example, in the case of a cast aluminum wheel, the retention element may be formed in situ during the casting of the wheel or may be machined subsequent to the casting process. In the case of a fabricated vehicle wheel, the first retention element 42 may be formed either during the manufacture of the wheel disc, such as for example, by spinning or stamping, or may be formed subsequent to the manufacture of the wheel disc, such as for example, by machining. Also, the particular shape, profile and/or location of the first retention element 42 may be other than illustrated if so desired.

In the illustrated embodiment, the wheel cover 50 includes a first or inner portion, indicated generally at 52, and a second or outer portion, indicated generally at 54. The wheel cover 50 is shown in this embodiment as preferably being formed from a plastic material and is preferably formed as a one-piece wheel cover. The wheel cover 50 has an inner surface 50A and an outer surface 50B. At least the outer surface 50B may be painted, chrome-plated or otherwise adorned or decorated if so desired. Also, the inner surface 50A of the wheel cover 50 may generally follow the contour of the adjacent outboard face 34 of the wheel 10 or the inner surface 50A may have selected portions which are spaced apart from the outboard face 34 to impart styling to the wheel 10 if so desired. Alternatively, the wheel cover 50 can be formed from other materials, such as metal and/or can be a multi-piece wheel cover formed of like or unlike materials if so desired. In addition, the wheel cover 50 may cover substantially the entire outboard face 34 of the vehicle wheel 10 or may cover only desired portions of the outboard face 34.

In the illustrated embodiment, the second retention element 44 is a tab or protuberance extending from the inner surface 50A of the cover 50 and provided at least along a portion of the outer portion 54 of the cover 50. In the illustrated embodiment, the second retention element 44 is preferably a continuous tab and has a shape which may generally be complimentary to the shape of the first retention element 42. The second retention element 44 is adapted to engage or be received into the first retention element 42 in order to secure or retain the wheel cover 50 on the vehicle wheel 10. The second retention element 44 includes an outermost circumferential surface 44A which is spaced a third radial distance R3 from the outer surface 28A of the outboard tire bead seat retaining flange 28. In the illustrated embodiment, the third radial distance R3 is preferably slightly greater then the second radial distance R2 and less than the first radial distance R1 in order to ensure that the tab 44 is received into the first retention element 42. Alternatively, the third radial distance R3 and/or the construction or make-up of the second retention element 44 may be other than illustrated and described if so desired. For example, the second retention element 44 may be a plurality of individual tabs spaced circumferentially about the cover 50 which are adapted to be received into the first retention element 42 shown in this embodiment or into a plurality of individual grooves if so desired.

As best shown in FIG. 2, in this embodiment the wheel cover 50 includes an outer annular portion or extension 56. The portion 56 includes an outermost surface 56A which extends radially outwardly relative to the outermost surface 44A of the second retention element 44 and toward the outer surface 28A of the outboard tire bead seat retaining flange 28. The outermost surface 44A of the portion 56 is preferably spaced a fourth radial distance R4 from the outer surface 28A of the outboard tire bead seat retaining flange 28 so as not to engage or contact the outer surface 28A. Alternatively, the fourth radial distance R4 and/or the construction or make-up of the portion 56 may be other than illustrated and described if so desired. Also, the particular shape, profile and/or location of the second retention element 44 may be other than illustrated if so desired.

In the illustrated embodiment, an adhesive, indicated generally at 60 only in FIG. 1, is preferably used to secure the wheel cover 50 to the vehicle wheel 10. Suitable adhesives 60 may include but are not limited to the use of one or a combination of more than one of adhesives selected from the group consisting of silicone, two-part epoxy, urethane, double-sided tape, expanding foam, and the like. The adhesive 60 may be selectively applied in a pre-assembly pattern so as to result in a full surface post-assembly pattern (not shown), or in a non-full surface post-assembly pattern (as shown in FIG. 1), i.e., a post-assembly pattern which has voids or gaps therein. Also, in addition to the adhesive 60, other mechanical means, such as for example, snap tabs and fasteners or other suitable mechanical members (not shown), may be used to assist in securing the wheel cover 50 the vehicle wheel 10 if so desired.

Turning now to FIG. 3 and using like reference numbers to indicate corresponding parts, there is illustrated a second embodiment of a portion of a vehicle wheel, indicated generally at 70, including a second embodiment of a wheel cover retention system, indicated generally at 72. In this embodiment, a wheel cover 74 includes a second tab 76 provided thereon which is located radially outwardly relative to the tab 44. The tab 74 is preferably a continuous tab and is operative to space apart at least a portion of an inner surface 78A of an outer annular portion or extension 78 of the wheel cover 72 from engagement with the adjacent outboard face 34 of the wheel 10. Preferably, to accomplish this, the axial length of the tab 44 in this embodiment is slightly longer than that of the tab shown in the embodiment of FIGS. 1 and 2. Also, adhesive 60 may be selectively deposited between the inner surface 78A and the outboard face 34 of the disc 14 if so desired. Alternatively, the construction, location or make-up of the second tab 76 may be other than illustrated if so desired.

Turning now to FIG. 4 and using like reference numbers to indicate similar parts, there is illustrated a third embodiment of a portion of a vehicle wheel, indicated generally at 80, including a second embodiment of a wheel cover retention system, indicated generally at 82. In this embodiment, a wheel cover 84 includes a second tab 86 provided thereon which is located radially outwardly relative to the tab 44. The tab 84 is preferably a continuous tab and extends inwardly from an inner surface 88A of an outer annular portion or extension 88 of the wheel cover 82. Also, in this embodiment, the wheel 80 includes a second groove or recess 90 formed therein which is located radially outwardly relative to the groove 42. The groove 90 is preferably a continuous groove and is operative to receive the second tab 86 of the wheel cover 80. In the illustrated embodiment, the groove 90 is larger than the tab 86 so as to loosely receive the tab 86 therein. However, the groove 90 may be sized and shaped generally complimentary to the tab 86 so that the tab 86 is received therein in an interference or press-fit if so desired. Also, as shown in the embodiment, the inner surface 88A of the outer annular portion 88 preferably contacts at least a portion of the outboard face 34 of the disc 14. Alternatively, the construction, location or make-up of the second tab 86 and/or the second groove 90 may be other than illustrated if so desired.

In accordance with the provisions of the patent statutes, the principle and mode of operation of this invention have been described and illustrated in its various embodiments. However, it must be understood that the invention may be practiced otherwise than as specifically explained and illustrated without departing from the scope or spirit of the attached claims.

What is claimed is:

1. A vehicle wheel cover retention system comprising:
a wheel formed from a suitable material and including a wheel rim and a wheel disc, the wheel rim including an inboard tire bead seat retaining flange, an inboard tire bead seat, a generally axially extending well, an outboard tire bead seat, and an outboard tire bead seat retaining flange, the wheel disc including a generally centrally located wheel mounting portion and an outer annular portion which defines an outboard face of the wheel, the wheel mounting portion provided with a centrally located pilot aperture and a plurality of lug bolt receiving holes circumferentially spaced around the pilot aperture, the outboard face having a retention groove formed therein, the retention groove located in the outboard face in a surface thereof defined radially outward relative to the well and radially inward relative to the outboard tire bead seat retaining flange; and
a wheel cover formed from a suitable material and including an outer portion having a tab formed thereon and an outer annular extension formed directly adjacent the tab and extending radially outwardly relative to the tab proximate the outboard tire bead seat retaining flange of the wheel;
wherein the tab is received in the retention groove to secure the wheel cover to the wheel.

2. The vehicle wheel cover retention system of claim 1 wherein the tab is a continuous tab.

3. The vehicle wheel cover retention system of claim 1 wherein an adhesive is selectively applied between the outboard face of the wheel and an inner surface of the wheel cover.

4. The vehicle wheel cover retention system of claim 1 wherein the tab is a first tab and further including a second tab provided on the outer annular extension.

5. The vehicle wheel cover retention system of claim 4 wherein the second tab engages the outboard face.

6. The vehicle wheel cover retention system of claim 4 further including a second groove formed in the outboard face and wherein the second tab is disposed in the second groove.

7. The vehicle wheel cover retention system of claim 1 wherein the outer annular extension includes an endmost surface, the endmost surface being spaced apart from contact with an adjacent inner surface of the outboard tire bead seat retaining flange.

8. The vehicle wheel cover retention system of claim 1 wherein the outer annular extension of the wheel cover includes an inner surface which engages an adjacent outer surface of the outboard face of the wheel.

9. The vehicle wheel cover retention system of claim 8 wherein only the inner surface of the outer annular extension of the wheel cover engages the adjacent outer surface of the outboard face of the wheel.

10. The vehicle wheel cover retention system of claim 1 wherein the retention groove includes a circumferentially extending first surface and a circumferentially extending second surface, the first surface spaced a first radial distance from a generally axially extending outer surface of the outboard tire bead seat retaining flange, the second surface spaced a second radial distance from the outer surface of the outboard tire bead seat retaining flange, and the tab includes an outermost circumferential surface which is spaced a third radial distance from the outer surface of the outboard tire bead seat retaining flange, the third radial distance being slightly greater then the second radial distance and less than the first radial distance.

11. The vehicle wheel cover retention system of claim 1 wherein the wheel cover is a one-piece plastic wheel cover.

12. A vehicle wheel cover retention system comprising:
a wheel formed from a suitable material and including a wheel rim and a wheel disc, the wheel rim including an inboard tire bead seat retaining flange, an inboard tire bead seat, a generally axially extending well, an outboard tire bead seat, and an outboard tire bead seat retaining flange, the wheel disc including a generally centrally located wheel mounting portion and an outer annular portion which defines an outboard face of the wheel, the wheel mounting portion provided with a centrally located pilot aperture and a plurality of lug bolt receiving holes circumferentially spaced around the pilot aperture, the outboard face having a retention groove formed therein, the retention groove located in the outboard face in a surface thereof defined radially outward relative to the well and radially inward relative to the outboard tire bead seat retaining; and
a wheel cover formed from a suitable material and including an outer portion having a tab formed thereon and an outer annular extension formed directly adjacent the tab and extending radially outwardly relative to said the tab proximate the outboard tire bead seat retaining flange of the wheel, the tab being received in the retention groove to secure the wheel cover to the wheel, the outer annular extension including an endmost surface which is spaced apart from contact with an adjacent inner surface of the outboard tire bead seat retaining flange;

wherein the retention groove includes a circumferentially extending first surface and a circumferentially extending second surface, the first surface spaced a first radial distance from a generally axially extending outer surface of the outboard tire bead seat retaining flange, the second surface spaced a second radial distance from the outer surface of the outboard tire bead seat retaining flange, and the tab includes an outermost circumferential surface which is spaced a third radial distance from the outer surface of the outboard tire bead seat retaining flange, the third radial distance being slightly greater then the second radial distance and less than the first radial distance.

13. The vehicle wheel cover retention system of claim 12 wherein the tab is a continuous tab.

14. The vehicle wheel cover retention system of claim 12 wherein an adhesive is selectively applied between the outboard face of the wheel and an inner surface of the wheel cover.

15. The vehicle wheel cover retention system of claim 12 wherein the tab is a first tab and further including a second tab provided on the outer annular extension.

16. The vehicle wheel cover retention system of claim 15 wherein the second tab engages the outboard face.

17. The vehicle wheel cover retention system of claim 15 further including a second groove formed in the outboard face and wherein the second tab is disposed in the second groove.

18. The vehicle wheel cover retention system of claim 12 wherein the outer annular extension of the wheel cover includes an inner surface which engages an adjacent outer surface of the outboard face of the wheel.

19. The vehicle wheel cover retention system of claim 18 wherein only the inner surface of the outer annular extension of the wheel cover engages the adjacent outer surface of the outboard face of the wheel.

20. A vehicle wheel cover retention system comprising:
a wheel formed from a suitable material and including a wheel rim and a wheel disc, the wheel rim including an inboard tire bead seat retaining flange, an inboard tire bead seat, a generally axially extending well, an outboard tire bead seat, and an outboard tire bead seat retaining flange, the wheel disc including a generally centrally located wheel mounting portion and an outer annular portion which defines an outboard face of the wheel, the wheel mounting portion provided with a centrally located pilot aperture and a plurality of lug bolt receiving holes circumferentially spaced around the pilot aperture, the outboard face having a circumferentially extending continuous retention groove formed therein, the retention groove located in the outboard face in a surface thereof defined radially outward relative to the well and radially inward relative to the outboard tire bead seat retaining; and
a one-piece wheel cover formed from a suitable material and including an outer portion having a circumferentially extending continuous tab formed thereon and an outer annular extension formed directly adjacent the tab and extending radially outwardly relative to the tab proximate the outboard tire bead seat retaining flange of the wheel, the tab being received in the retention groove to secure the wheel cover to the wheel, the outer annular extension including an endmost surface which is spaced apart from contact with an adjacent inner surface of the outboard tire bead seat retaining flange;
wherein the retention groove includes a circumferentially extending first surface and a circumferentially extending second surface, the first surface spaced a first radial distance from a generally axially extending outer surface of the outboard tire bead seat retaining flange, the second surface spaced a second radial distance from the outer surface of the outboard tire bead seat retaining flange, and the tab includes an outermost circumferential surface which is spaced a third radial distance from the outer surface of the outboard tire bead seat retaining flange, the third radial distance being slightly greater then the second radial distance and less than the first radial distance.

* * * * *

UNITED STATES PATENT AND TRADEMARK OFFICE
CERTIFICATE OF CORRECTION

| | | |
|---|---|---|
| PATENT NO. | : 7,448,695 B1 | |
| APPLICATION NO. | : 11/584432 | |
| DATED | : November 11, 2008 | |
| INVENTOR(S) | : Joseph Wolf | |

It is certified that error appears in the above-identified patent and that said Letters Patent is hereby corrected as shown below:

Column 6, Claim 12, line 61, after "to", delete "said".

Signed and Sealed this

Thirtieth Day of December, 2008

JON W. DUDAS
*Director of the United States Patent and Trademark Office*